March 5, 1957
R. S. LOCKE ET AL
2,784,062
LIME PROCESS
Filed June 7, 1954
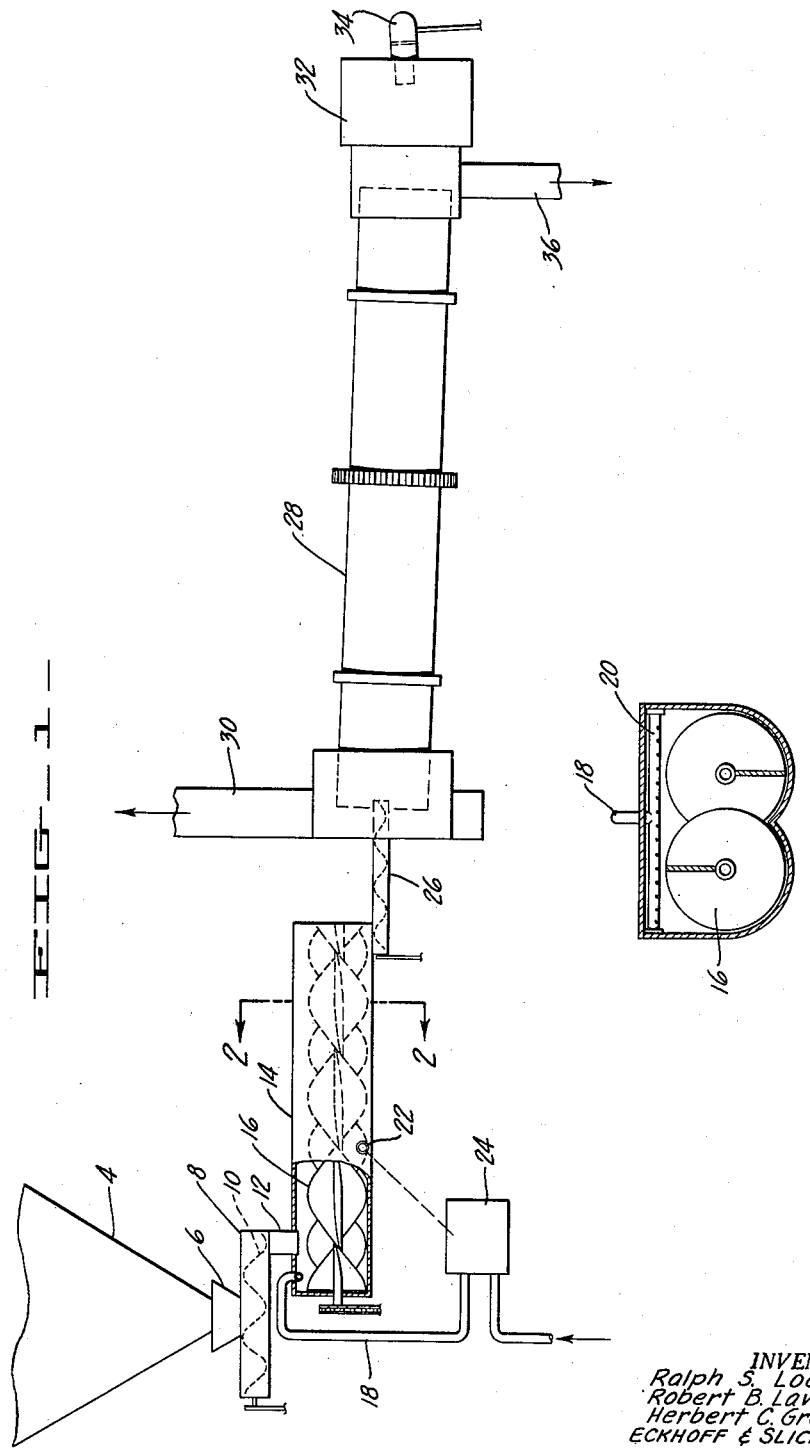
INVENTORS.
Ralph S. Locke
Robert B. Lawson
Herbert C. Green
ECKHOFF & SLICK, Attys.
By
A member of the firm

United States Patent Office 2,784,062
Patented Mar. 5, 1957

2,784,062

LIME PROCESS

Ralph S. Locke, San Francisco, and Robert B. Lawson and Herbert C. Green, Diamond Springs, Calif., assignors to Diamond Springs Lime Company, a corporation of California Application June 7, 1954, Serial No. 434,722

3 Claims. (Cl. 23—188)

The present invention relates to the making of a high calcium content substantially dry hydrated lime with the following qualities upon being reconstituted by the addition of water: high plasticity, exceptional workability, hodability, bond and sand carrying capacity, slow setting, uniform in particle size and shape to achieve controlled dispersion in water media, and the immediate availability of the above properties upon mixing the dry hydrated lime with water.

In the history of dry hydrated lime manufacture there has been little success in producing a substantially dry hydrated high calcium lime containing the above-mentioned qualities. In the past, a quicklime putty was first choice for a normal job requiring the use of a lime putty, and such a putty generally met all of the above quality requirements. A demand has been growing since the turn of the century for a dry lime hydrate that would produce a mix with substantially the same characteristics as that of a quicklime putty. The present invention claims a new and novel means whereby a high calcium lime putty can be converted into the dry hydrate and yet have the characteristics of a quicklime putty immediately upon mixing the dry hydrate with water.

It is well-known that a high calcium lime (CaO) hydrates in essentially a single stage, whereas a dolomitic lime (CaO·MgO) hydrates in two stages, calcium oxide reacting first, and the rate of magnesia hydration varies enormously, depending upon the impurities and the temperature of calcination. In commercial practice, the hydration of dolomitic lime is forced, through pressure hydration by various mechanical means, to ensure complete hydration of the magnesia. Such pressure hydration is not necessary to completely convert a high calcium lime into the hydrate within a matter of a few minutes after the addition of water to the quicklime. The properties of a dolomitic lime lie between those of calcium oxide and magnesia, and the properties of calcium oxide in dolomitic lime may be due, in particular, to the modification of surface activity of the calcium oxide molecules by contiguous magnesia. On being calcined at a high temperature, dolomitic lime shrinks and loses its reactivity with water, at a lower temperature than pure lime, and shrinkage and increase in bulk density is due to crystal growth. The temperature at which this crystal growth takes place varies greatly with the amount and nature of the impurities present.

Of importance in the conversion of a high calcium quicklime to the hydrate is the lack of expansion characteristics of the calcium hydroxide lime particle. This lack of expansion is not synonymous with the change in volume so noticeable when a quicklime is converted to the hydrate on the addition of water. The two phenomena are entirely different. This may be understood by the following:

When a high calcium lime is hydrated it swells and the powder or putty formed occupies a much greater volume than the original lime. Calcium hydroxide has a specific gravity of 2.24, and the oxide 3.30; therefore, there must be an increase in volume when solid calcium oxide is hydrated. Ordinary high calcium lime, though, is porous, and if made from limestone at the lowest possible temperature—without shrinkage—its apparent density is 1.52 and 2.2 lbs. occupies 660 ccs. After hydration, it weighs 2.9 lbs. and occupies 590 ccs. with a specific gravity of 2.24. Thus, if the lime does not shrink more than 10.6 percent in burning there is space in the pores for it to hydrate without expansion. On lightly burning, a high calcium limestone does not shrink as much as 10.0%. The large increase in volume which ordinarily occurs in hydration is due to the shape of the hydrate particles formed, when a dry hydrate is produced, and to the high dispersion and presence of adsorbed water, when the lime is slaked in excess of water. Therefore, a very active high calcium lime hydrates without expansion even in excess water.

Another important feature concerning the production of a substantially dry high calcium hydrate containing the desirable qualities of a quicklime putty, is the preservation of the calcium hydrogel formed during the slaking reaction. When calcium oxide and water combine a violent exothermic reaction occurs. The heat of hydration, i. e., the heat evolution of the reaction at 20° C. is 276 calories per gram (497 B. t. u.'s per pound) based on CaO or 209 calories per gram (376 B. t. u.'s per pound) based on Ca(OH)$_2$. Such an evolution of heat may quickly convert the water required for hydration from the liquid to the vapor phase, and water in the form of a vapor, at elevated temperatures, has been proven detrimental in producing a hydrate with the aforementioned quicklime putty qualities. Also, there is a pronounced growth of the calcium hydroxide crystal when hydration occurs with water in the vapor phase at elevated temperatures. This, in effect, will destroy the colloidal condition of the lime particle. When lime is hydrated in an excess of water to produce a putty, the putty contains calcium hydroxide in the maximum possible degree of dispersion, and the putty, for a given consistency, contains the maximum amount of water. To attain a high degree of particle dispersion, hydration of all of the lime must take place in the presence of excess liquid water, and it is necessary to avoid conditions which produce burning or drowning of the lime particle.

Experimentally, we have found that a reactive high calcium quicklime, sized so that all of the fractions will pass a screen having an opening of 0.035 inch, and slaked with sufficient water to ensure a maximum slaking temperature of 80° C. will substantially produce a lime putty that is colloidal in nature with a minimum of crystal growth, and which has little, if any, of the fluid characteristics of the usual lime putty. When the lime is hydrated in the presence of liquid water, rapidly and intimately mixed to ensure immediate and complete hydration, with proper temperature control, none of the ultimate qualities of a quicklime putty are lost during the slaking process.

A hydrate slaked in the above manner retains approximately 40 to 45 percent "free" and combined moisture. By reducing the "free" water content to less than 0.5%, through controlled drying, a substantially dry hydrate of lime is produced. It is necessary, for reasons of quality in the finished product, i. e., high plasticity in excess than that of a normal high calcium hydrated lime, to preserve the calcium hydrogel formed in the slaking process. If a calcium hydrogel is heated in excess of 100° C., it seemingly gives up its water of formation (assuming the material is under atmospheric pressure), and becomes calcium hydroxide, which gives up water of crystallization at 580° C. Most conventional driers will perform the drying function providing there is no prolonged material contact with hot gases rich in carbon dioxide. The necessity of avoiding prolonged contact with gases containing carbon dioxide is that limited recarbonization of the material may occur with elevated temperatures producing a catalytic effect. This may be expressed by the following:

$$Ca(OH)_2 + CO_2 \rightarrow CaCO_3 + H_2O$$

The water vapor present in the drying gases and exuding from the drying lime hydrate tends to reduce any recarbonization when the gases are applied directly to the material. Too, the heat of vaporization, 552 gram calories at 80° C., may function so as to keep the drying material from reaching a critical temperature during the process.

The method stated herein is one for producing from a high calcium quicklime of not more than 10% magnesium content a hydrated lime of superior physical characteristics for building construction use without resorting to pressure above atmospheric or equipment greatly different than that commonly found in use; it being generally considered that these desirable physical characteristics are unattainable in hydrated lime produced from other than a magnesium or dolomitic quicklime of more than 10% magnesium content and except by use of specially designed equipment to carry out hydration above atmospheric pressure.

A plastic hydrated lime must be one that will so react with water as to produce a putty having a plasticity of numerical value 200 or more as determined by the Emley plasticimeter developed by the United States Bureau of Standards. It is generally recognized that a hydrated lime putty that will yield a plasticity figure of 200 or more will spread comparatively easily over an absorbent surface. Most commercial lime hydrates do not exceed this figure.

The present invention claims a slaking method whereby a high calcium quicklime is slaked in excess of liquid water to form a lime putty having a placticity in excess of 300, as measured by the Emley plasticimeter, and a means of drying said lime putty without destroying the plastic properties of the lime hydrate.

The colloidal condition of the lime hydrate is of great importance in the ability of the product to render a high sand carrying capacity. Accepted as the standard of measure for the sand carrying capacity of lime, cement, and comparable products, in relation to the workability of these products, is the Voss extrusion energy machine. This machine and the procedure employed for sand carrying measurement is described in detail in "Effects of Lime on Mortar and Concrete" by Dr. Walter H. Voss, in Proceedings of the National Lime Association, 1939. The sand carrying capacity of the product produced by the present invenmtion will be approximately 4 to 4½ parts sand to one part lime as measured by the Voss extrusion energy machine. This is in excess of most known high calcium lime hydrates.

In the drawings forming a part of this application:

Figure 1 is a side elevation of the slaker and drier which may be used in carrying out the present invention.

Figure 2 is a cross-section on the lines 2—2 of Figure 1.

The operation of the equipment is as follows: Unslaked lime is passed from the bulk hopper 4 to the surge hopper 6. The lime then passes through the conveyor 8, which has a feed screw 10 therein, which permits precise control of the amount of lime which is introduced through passage 12 into the slaker 15. The slaker 14 is equipped with twin mower type blades 16. Water is introduced into the slaker through line 18 and the header 20. A thermocouple 22 is provided in the slaker 14 and this is connected to the controller 24 which controls the amount of water flowing through line 18. As the temperature starts to rise in the slaker 14, more water is introduced and vice versa, so that a substantially constant temperature is maintained in the slake.

From the slaker, the hydrated lime is passed by means of the screw conveyor to the drier 28. This is a conventional direct fired rotary drier equipped with a furnace box 32, a burner 34, and an outlet for gases, 30. The lime passes through the drier 28 and is then discharged through the outlet 36, whereupon it is milled to size.

The slaking process is controlled by these means:

(a.) A constant and measured flow of quicklime enters the slaker.

(b.) The water requirement is adjusted to meet the quicklime demand. This demand varies as the activity (rate of temperature rise) of the quicklime. To adjust the water flow, the thermocouple, 22, placed at the point of maximum temperature within the slaker, is connected to a controller-recorder instrument. The zero temperature is 77° C. (170° F.) as applied to the thermocouple. As the temperature rises, the water flow is increased, and as the temperature falls, the water flow is decreased; thus maintaining as close to 77° C. recorded temperature as possible, but never over 80° C.

(c.) The water requirement deemed necessary in this process to ensure proper slaking has been shown by experiment to be between 60 and 65 percent by weight of the ratio pounds of quicklime:pounds of water. For example, to produce 1200 pounds of finished product, at 27% free and combined water, requires about 900 pounds of quicklime plus 1400 pounds of water. The loss of water as vapor during the exothermic reaction of the slaking process requires an added surplus of water. This added amount is dictated by the activity of the quicklime. The consistency of the lime putty must be held within very narrow limits to ensure no loss in the quality of the resultant hydrate, nor ability to handle the putty mechanically.

While this process is continuous, for convenience we shall follow the required conditions for the production of one ton of finished product. For every 2,000 pounds of high calcium lime hydrate produced, 1,500 pounds of sized quicklime is reacted with 2,300 pounds (275 gallons) of water. The resultant maximum slaking temperature is held to approximately 80° C. The slaked lime containing an excess of "free" moisture (about 10% to 15% by weight) is fed into the conventional rotary drier 28. Although a rotary drier is herein employed, any standard drier may be used such as spray drier or a fluo-solids drier. The drying material is elevated through the drier by means of lifters and falls through the counter flowing hot gases maintained at a maximum of 450° C., the material following the inclined path of the drier. The material follows the inclined path of the drier to the discharge end where it is conveyed to a mill for final reduction. The discharged particles range from about ½" in size to dust.

A standard furnace box 9 of adequate size and design is used to heat the drying gases. The gases are maintained at a temperature of 370° C. to 425° C. Any excess of heat is detrimental to the quality of the hydrate. In this process, the effect of too much heat affecting the hydrate qualities cannot be overemphasized as the hydrogel formed during slaking may be destroyed. At no time must the temperature of the drying lime hydrate exceed 100° C.; if this temperature is exceeded, a psuedo-structure is formed within the crystal lattice of the calcium hydroxide molecule, and after the finished product has aged for a certain time, there is a very serious drop in the plasticity, sand carrying capacity, and other qualities of the hydrate. Another dangerous possibility is the localized recalcination of the lime hydrate by the application of excess heat conveying gases containing $CO_2$ during the drying process. An excessive drop in the plasticity of the finished hydrate is immediately noticed if recalcination occurs.

The final processing step is the milling of the drier effluent. To enhance the immediate availability of the hydrate qualities, the material is tube milled to the extent that better than 90% of the particles shall pass a No. 200 mesh sieve. The particle size distribution is so adjusted as to give uniform, controlled availability of the hydrate qualities, and to facilitate dispersion of the lime hydrate in a water mix.

The drier material is conveyed to the feed end of the tube mill through which it passes at a predetermined rate. The oversize particles passing out of the discharge end of the mill are returned for further milling, and the finished product is elevated to the bagger.

While the use of ball mills of various types is common in the non-metallic mineral field as a reduction or agglomerating medium, its use in this invention is for an entirely different reason, i. e., to separate agglomerates of finely dispersed micron particles of hydrated lime and in so doing impart to the so separated lime hydrate particle a disc or plate shape thereby increasing surface area which imparts to the hydrated lime the highly desirable physical characteristics of wettability, slow settling, and greater water retention, among others.

Water is adsorbed on the surface of the lime hydrate particle and the greater the surface area available, the greater the ability of the particle to become wet and to retain the adsorbed water against any force acting to remove the water. Also, particles of equal weight and density may have different settling rates in water media due to their shape, the disc or plate shaped particles generally having the slowest settling rate.

We claim:

1. A process of making a dry hydrated lime comprising the steps of continuously hydrating an active, high calcium quick lime in the presence of liquid water only at a temperature of not over 80° C. and at atmospheric pressure to produce a hydrated lime putty containing from about 10% to about 15% of free moisture, continuously passing the thus-formed lime putty into a zone wherein said putty is subjected to continuous mechanical agitation and passing counter-currently through the thus agitated lime putty gas maintained at a temperature at from 370° C. to 425° C., said putty passing through said zone at such a speed and under conditions of agitation whereby the hydrated lime putty is dried by said application of hot gas, but wherein the temperature of the hydrated lime is maintained below 100° C., and tube milling the dry hydrated lime thus produced.

2. The process of claim 1 wherein the amount of water used for hydration is about 60% to 65% by weight of the quicklime.

3. The process of claim 1 wherein the maximum particle size of the quicklime is that passing a 0.035 inch screen.

References Cited in the file of this patent
UNITED STATES PATENTS

| | | |
|---|---|---|
| 1,239,256 | Carson | Sept. 4, 1917 |
| 1,277,855 | Carson | Sept. 3, 1918 |
| 1,377,401 | Crow | May 10, 1921 |
| 1,664,598 | Dittlinger | Apr. 3, 1928 |
| 1,871,530 | Keller | Aug. 16, 1932 |
| 2,044,553 | Welch | June 16, 1936 |
| 2,147,191 | Carson | Feb. 14, 1939 |
| 2,408,647 | Hutzicker | Oct. 1, 1946 |